United States Patent [19]

Chuguev et al.

[11] 4,224,661
[45] Sep. 23, 1980

[54] EXTERNALLY COMMUTATED COMPENSATION-TYPE CONVERTER SYSTEM AND METHOD OF FORCED COMMUTATION AND BLOCKING OF RECTIFIERS THEREOF

[76] Inventors: Jury M. Chuguev, ulitsa Kirova, 25, kv. 234; Taisia A. Matkova, ulitsa Matrosova, 5, kv. 4; Svetlana A. Ivanova, ulitsa Nikolaeva, 14, kv. 49; Geny K. Solodkov, ulitsa Rylenkova, 3, kv. 4, all of Smolensk; Sergei I. Pischikov, ulitsa Angarskaya, 61, kv. 20; Vsevolod I. Pischikov, ulitsa Ussuriiskaya 1, korpus 4, kv. 139, both of Moscow; Boris M. Antonov, ulitsa Mayakovskogo, 2, kv. 22, Khimki Moskovskoi oblasti, all of U.S.S.R.

[21] Appl. No.: 942,496

[22] Filed: Sep. 13, 1978

[51] Int. Cl.$^2$ .......................................... H02M 7/515
[52] U.S. Cl. ...................................... 363/71; 363/138
[58] Field of Search ................................... 363/27–28, 363/96, 135–138, 71, 128–130, 67, 69–70, 34–37

[56] References Cited

U.S. PATENT DOCUMENTS

| | | | |
|---|---|---|---|
| 3,076,924 | 2/1963 | Manteuffel | 363/91 X |
| 3,221,187 | 11/1965 | Clifton | 363/91 X |
| 3,392,319 | 7/1968 | McColl et al. | 363/129 |
| 3,705,341 | 12/1972 | Frank | 363/135 |
| 3,711,759 | 1/1973 | Krauthamer | 363/57 |
| 3,768,001 | 10/1973 | Thorborg | 363/71 |
| 3,839,666 | 10/1974 | Kitaev | 363/138 |
| 3,932,799 | 1/1976 | Frank et al. | 363/71 |
| 4,056,766 | 11/1977 | Zander | 363/138 X |
| 4,087,851 | 5/1978 | Klautschek | 363/138 X |

FOREIGN PATENT DOCUMENTS

46-12172  3/1971  Japan ........................ 363/138

Primary Examiner—J. D. Miller
Assistant Examiner—Peter S. Wong
Attorney, Agent, or Firm—Haseltine, Lake & Waters

[57] ABSTRACT

An externally commutated compensation-type converter system comprises a control unit which connects a main and an additional bridge, each built around controlled semiconductor rectifiers. Shunt capacitors are coupled in parallel with respective a-c terminals of the main bridge and series capacitors are placed between respective a-c terminals of the main and the additional bridge. A smoothing reactor connects respective d-c terminals of the main and the additional bridge, said d-c terminals being arranged to interconnect one another. Terminals of the series capacitors, the a-c terminals of the main bridge and terminals of two respective shunt capacitors, which interconnect one another, are used to form common a-c terminals coupled to an a-c mains. According to the proposed method providing for forced commutation and blocking of the rectifiers of the converter system, the shunt and series capacitors, after they have been charged, are coupled to the rectifiers being blocked. The control unit is operated to act on the gates of the rectifiers and to transfer the current passing through the smoothing reactor from one rectifier to another in a given sequence. At the beginning of the commutation interval, the current passing through the smoothing reactor is transferred from one of the rectifiers of the main bridge to one of the rectifiers of the additional bridge via a respective series capacitor. At the end of the commutation interval, the current passing through the smoothing reactor is transferred from one of the rectifiers of the additional bridge and from one of the series capacitors to a respective rectifier of the next phase belonging to the main bridge. During the commutation interval, the current passing through the smoothing reactor is allowed to pass through one more of the rectifiers of the additional bridge and through one more of the series capacitors.

41 Claims, 41 Drawing Figures

EXTERNALLY COMMUTATED COMPENSATION-TYPE CONVERTER SYSTEM AND METHOD OF FORCED COMMUTATION AND BLOCKING OF RECTIFIERS THEREOF

FIELD OF THE INVENTION

The invention relates to converter systems, and more particularly to externally commutated converter systems and methods providing for forced commutation and blocking of their rectifiers.

The converter system of the invention has the following uses: an inverter or a reactive power compensator for magnetohydrodynamic (MHD) generators; a high-speed reactive power compensator for d-c power systems; a compensation-type static converter for inverter and rectifier substations for d-c transmission systems; a reactive power source for regulation of voltage produced by independent power supply systems.

DESCRIPTION OF THE PRIOR ART

At present, the advent of the MHD method of producing electric energy, high-power energetic systems and d-c transmission systems gives a tremendous impetus to semiconductor converter development. According to new requirements, the power factor of inverter sections of MHD stations must be increased and stabilized while the externally commutated inverter must be provided with a higher stability concerned with inverting failures which might occur due to deviation of the electromotive force of the generator channel in response to random plasma fluctuations and due to random variations of the electromotive force of a-c mains. Moreover, rectifiers of higher stability require that their power factors be stabilized under conditions of intense grid control.

Known in the art is a compensation-type converter system made in the form of a reactive power compensator (cf. the USSR Inventor's Certificate No. 136,453 Int. cl. HO2j 3/18) comprising a control unit, a main bridge built around rectifiers having their gates coupled to the control unit, at least three shunt capacitors coupled in parallel with respective a-c terminals of the main bridge, and a smoothing reactor which connects d-c terminals of the main bridge.

Forced commutation is accomplished, however, in the described converter system under the action of a control system. The main bridge must be built, in this case, around fully controlled semiconductor rectifiers in order to provide for commutation in the region where reactive power is generated. This means that the converter system is concerned with power applications only since power silicon and mercury-arc rectifiers can provide for forced commutation only when additional action of the blocking voltage takes place between the cathode and the anode. As a result, the utilization factor of the shunt capacitors is low since commutation failure occurs within the area where reactive power is generated provided the latter is increased up to magnitudes exceeding the power of the shunt capacitors; this feature results in a considerable decrease in the area related to the working characteristics of the converter system and its regulating capability is decreased too.

Moreover, the presence of fully controlled semiconductor rectifiers in the main bridge, which are turned off by the control unit, requires that a high-power control unit be employed.

The prior art teaches a method providing for forced commutation and blocking of an externally commutated compensation-type converter system (cf. the USSR Inventor's Certificate No. 136,453, HO2j 3/18) comprising the transfer of the current passing through the smoothing reactor from one rectifier to another; connecting a previously charged capacitor to the rectifier being blocked; and operating the control system to act on the gates of the rectifiers.

In the described method, the transfer of the current passing through the smoothing reactor from one rectifier to another is accomplished within a single step and is accompanied by an abrupt variation of the current being commutated from one phase to another in an indefinitely small time interval (instantaneous commutation). At the same time, an abrupt variation of the current passing through the shunt capacitor circuit takes place and maximum magnitudes of higher harmonic content are available in the d-c circuit at the preset capacitances of the shunt capacitors.

In compensation mode, there result considerable abrupt variations of forward voltage whose magnitudes are equal to the potential difference of the phases being commutated at the beginning of commutation. This leads to surges of positive voltages across the anodes of the blocked rectifiers and across the d-c terminals of the main bridge with the result that the rectifiers are allowed to be turned on some time earlier. As a result, commutation failure occurs, interference level is increased and the d-c circuit is influenced harmfully.

In addition, commutation failure might occur in the externally commutated converter system operated in the inverting mode due to random variations of the a-c mains voltage or due to variation in the voltage produced by a d-c source (say, an MHD generator having its channel with plasma fluctuating on a random basis). This may lead to emergency conditions related to both the a-c mains and the MHD generator channel.

SUMMARY OF THE INVENTION

An object of the invention is to provide an externally commutated converter system and a method providing for forced commutation and blocking of rectifiers thereof, so that an increased commutation stability of the system is attained.

Another object of the invention is to provide for an increased utilization factor of the capacitors of the externally commutated compensation-type converter system along with simultaneous reduction of voltage commutation surges.

Still another object of the invention is to provide for an increased region within the working characteristics of the system are effective.

With these and other objects in view, there is provided an externally commutated compensation-type converter system comprising a control unit, a main bridge incorporating controlled semiconductor rectifiers having their gates coupled to a control unit, at least three shunt capacitors coupled in series with respective a-c terminals of the main bridge, and a smoothing reactor which connects d-c terminals of the main bridge, wherein there is provided, according to the invention, an additional bridge incorporating controlled semiconductor rectifiers having their gates coupled to the control unit and at least three series capacitors inserted between respective a-c terminals of the main bridge and respective a-c terminals of the additional bridge which has its d-c terminals coupled to identical d-c terminals of the main bridge and to the smoothing reactor, terminals of the series capacitors, the a-c terminals of the main bridge and terminals of two respective shunt capacitors being arranged to connect one another so that common a-c terminals are formed which are coupled to an a-c mains.

Advantageously, the converter system is provided with at least three inductors, each of which has its first terminal coupled to a respective common a-c terminal and its second terminal serving as the converter system output.

Preferably, the converter system is provided with at least three capacitors, each of which has its first terminal coupled to a respective common a-c terminal and its second terminal serving as the converter system output.

Advantageously, the converter system is provided with a matching transformer having its first terminals coupled to the common a-c terminals and its second terminals serving as the converter system outputs.

It is advantageous that the converter system is provided with two additional saturation inductors, each of which is coupled between respective d-c terminals of the main and the additional bridge.

It is preferable that there is provided the converter system wherein the two additional saturation inductors have their windings wound on a common magnetic circuit.

It is advantageous that there is provided the converter system wherein the common magnetic circuit of the two additional saturation inductors is made of a magnetically soft material and has no air gap.

Advantageously, the converter system is provided with a d-c source having its first output coupled to the smoothing reactor and its second output coupled to one of the additional saturation inductors and to that d-c terminal of the main bridge which is coupled to said saturation inductor.

Preferably, the converter system is provided with at least three additional inductors which are placed between respective a-c terminals of the main and the additional bridge.

There is proposed a method for providing forced commutation and blocking of the rectifiers of the externally commutated compensation-type converter system comprising the transfer of the current passing through the smoothing reactor from one rectifier of the main bridge to another; connecting a respective capacitor, after it has been charged, to a respective rectifier being blocked; and operating the control unit so as to act on the gates of the rectifiers, said transfer of said current being accomplished, according to the invention, as follows: at the beginning of the commutation interval, the current passing through the smoothing reactor is transferred from one of the rectifiers of the additional bridge, via at least one of the series capacitors, to at least one of the rectifiers of the additional bridge, while at the end of the commutation interval the current is transferred from at least one of the rectifiers of the additional bridge and from one of the series capacitors to a respective rectifier of the next phase belonging to the main bridge, the current being allowed to pass through at least one more of the rectifiers of the additional bridge and through at least one more of the series capacitors.

Preferably, the proposed method comprises unblocking, at the beginning of commutation, a respective rectifier of the next phase belonging to the additional bridge; blocking a respective rectifier of the preceding phase of the main bridge with the help of the reverse voltage determined by the charges on a respective shunt capacitor of the phase being commutated and on a respective series capacitor of the next phase, said two capacitors being connected, at the given point in time, in series and coupled to said respective rectifier; unblocking a respective rectifier of the preceding phase belonging to the additional bridge at a point in time when the voltage applied to the rectifier reverses its polarity; and connecting additionally a respective capacitor of the preceding phase to a respective rectifier of the same phase belonging to the main bridge during the given commutation step.

It is advantageous that the proposed method comprises unblocking, at the beginning of commutation, two rectifiers of the next and preceding phases, respectively, belonging to the additional bridge and blocking a respective rectifier of the preceding phase belonging to the main bridge with the help of the reverse voltage determined by the resulting charge on a respective shunt capacitor of the phase being commutated and on a respective series capacitor of the next phase, said two capacitors being connected, at the given point in time, in series and coupled to said respective rectifier, as well as on a respective series capacitor of the preceding phase which is being coupled, at the given point in time, to said respective rectifier.

It is preferable that the proposed method comprises unblocking, at the beginning of commutation, a respective rectifier of the preceding phase belonging to the additional bridge and blocking a respective rectifier of the same phase belonging to the main bridge with the help of the reverse voltage determined by the charge on a respective series capacitor of the preceding phase; unblocking, during the next commutation step, a respective rectifier of the next phase belonging to the additional bridge at the point in time when the voltage applied to the rectifier reverses its polarity; and additionally connecting a respective shunt capacitor of the phase being commutated and a respective series capacitor of the next phase, said two capacitors being connected in series at the given point in time.

Advantageously, the proposed method comprises unblocking, at the end of the commutation interval of the last commutation step, the next one of the rectifiers of the main bridge when the voltage applied to said rectifier reverses its polarity.

Preferably, the proposed method comprises unblocking a respective rectifier of the next phase belonging to the main bridge at the end of the commutation interval of the last commutation step after the voltage applied to said rectifier has reversed its polarity, and the additional charges, that are accumulated on the series capacitors of the phases being commutated within the time interval between the point in time when the voltage applied to the next one of the rectifiers of the main bridge reverses its polarity and the end of the commutation interval, being held constant to change the blocking voltage across one of the rectifiers of the main bridge at the beginning of the next commutation interval.

It is advantageous that the proposed method comprises unblocking, at the end of the commutation interval of the last commutation step, a respective rectifier of the next phase belonging to the main bridge prior to the point in time when the voltage applied to said rectifier reverses its polarity, and the additional charges, that are accumulated on the series capacitors of the phases being commutated, are held constant to change the blocking voltage of one of the rectifiers of the main bridge at the beginning of the next commutation interval.

It is preferable that the proposed method comprises blocking, at the end of the commutation interval of the last commutation step, a respective rectifier of the preceding phase belonging to the additional bridge with the help of the reverse voltage determined by the charge on a respective shunt capacitor of the phase being commutated and on a respective series capacitor of the next phase, said two capacitors being connected at the given point in time in series and coupled to said respective rectifier and simultaneous blocking of a respective rectifier of the next phase belonging to the additional bridge with the help of the reverse voltage determined by the charge on a respective series capacitor of the next phase which is coupled, at the given point in time, in parallel with said respective rectifier.

Advantageously, the proposed method comprises simultaneous blocking, at the end of the commutation interval of the last commutation step, of two rectifiers of the preceding and next phases, respectively, belonging to the additional bridge when forward voltage is applied to them with the help of control pulses.

Preferably, the proposed method comprises blocking, prior to the end of the commutation interval, a respective rectifier of the preceding phase belonging to the additional bridge when forward voltage is applied to the rectifier with the help of a control pulse.

It is advantageous that the proposed method comprises blocking, prior to the end of the commutation interval, a respective rectifier of the next phase belonging to the additional bridge when forward voltage is applied to the rectifier with the help of a control pulse.

The invention allows the current through the smoothing reactor to be distributed, within the commutation interval, between the phases being commutated for the time spent for unblocking simultaneously two rectifiers of the additional bridge, which results in a considerable suppression of higher harmonic content available to the a-c circuit.

In addition, the invention provides for an increased stability with respect to commutation failures which may result from high overloads on the converter system.

With this invention, sudden positive changes in voltage can be eliminated and the rate of rise of forward voltage across the anodes of the blocked rectifiers can be decreased with the result that they cannot be turned on accidentally.

The invention also provides for an increase in the duration of the commutation interval and for a decrease in sudden changes of commutating voltages. This tends to decrease surges of voltages across the d-c terminals of the main bridge and resists the influence of commutation processes on the d-c circuit (in particular, on the MHD generator channel).

Moreover, the invention makes it possible to turn on the next rectifier of the main bridge after the polarity of the voltage applied to it has been reversed, thereby resulting in a more prolonged commutation process. As a result, the number of charges accumulated on the capacitors and used during a further commutation varies forcedly. Now, the time during which reverse voltage is applied to the rectifier being blocked can be controlled independent of the existing operating conditions, an important feature providing for commutation stability of the converter system, with a-c mains in emergency or with a considerable asymmetry of phase voltages.

DESCRIPTION OF THE DRAWINGS

Other features and advantages of the invention will appear from the following description of a preferred embodiment thereof in conjunction with the accompanying drawings, in which:

FIGS. 11a, b, c, d, e, f, g, h, i show operational timing diagrams for the converter system of FIGS. 5, 8 according to the invention;

FIGS. 12a, b, c, d show operational timing diagrams of the converter system of FIGS. 5, 8 operated with excess power rating, according to the invention;

FIG. 13 shows inverted current/firing angle relationships for the converter system of FIG. 5, according to the invention;

FIGS. 14a, b and c show operational timing diagrams for the total voltage across the smoothing reactor and across the d-c source of the converter system of FIGS. 1, 2, 5 with the a-c mains in emergency, according to the invention.

DESCRIPTION OF THE INVENTION

Given below is the description of the externally commutated compensation-type converter system of the invention (hereinafter referred to as the converter system) operated in conjunction with an MHD station.

The converter system comprises a main bridge 1 (FIG. 1) built around controlled semiconductor rectifiers 2, 3, 4, 5, 6, 7 and an additional bridge 8 built around controlled semiconductor rectifiers 9, 10, 11, 12, 13, 14. The gates of the rectifiers 2, 3, 4, 5, 6, 7, 9, 10, 11, 12, 13, 14 are coupled to the outputs of a control unit 16. The main bridge 1 has three a-c terminals 17, 18, 19. The a-c terminal 17 is coupled to the cathode of the rectifier 2 and to the anode of the rectifier 3. The a-c terminal 18 is coupled to the cathode of the rectifier 4 and to the anode of the rectifier 5. The a-c terminal 19 is coupled to the cathode of the rectifier 6 and to the anode of the rectifier 7. The additional bridge 8 has three a-c terminals 20, 21, 22. The a-c terminal is coupled to the anode of the rectifier 9 and to the cathode of the rectifier 10. The a-c terminal 21 is coupled to the anode of the rectifier 11 and to the cathode of the rectifier 12. The a-c terminal 22 is coupled to the anode of the rectifier 13 and to the cathode of the rectifier 14. A series capacitor 23 is placed between the a-c terminal 20 of the additional bridge 8 and the a-c terminal 17 of the main bridge 1. A series capacitor 24 is placed between the a-c terminal 21 of the additional bridge 8 and the a-c terminal 18 of the main bridge 1. A series capacitor 25 is placed between the a-c terminal of the additional bridge 8 and the a-c terminal 19 of the main bridge 1. One terminal of the series capacitor 24, the a-c terminal 18 of the main bridge 1 and the terminals of shunt capacitors 26, 27, all coupled to a connection point 29, are used to form a common a-c terminal 30. One terminal of the series capacitor 24, the a-c terminal 18 of the main bridge 1 and the terminals of shunt capacitors 26, 28, all connected to a connection point 31, are used to form a common a-c terminal 32. One terminal of the series capacitor 25, the a-c terminal 19 of the main bridge 1 and the terminals of the shunt capacitors 27, 28, all connected to a connection point 33, are used to form a common a-c terminal 34. The main bridge 1 has d-c terminals 35, 36. The d-c terminal 35 is coupled to the cathodes of the rectifiers 3, 5, 7, while the d-c terminal 36 is coupled to the anodes of the rectifiers 2, 4, 6. The additional bridge 8 has d-c terminals 37, 38. The d-c terminal 37 is coupled to the cathodes of the rectifiers 9, 11, 13, while the d-c terminal 38 is coupled to the anodes of the rectifiers 10, 12, 14. The d-c terminals 35, 37 and one terminal of a smoothing reactor 39 are connected to a connection point 40, while the d-c terminals 36, 38 and the other terminal of the smoothing reactor 39 are connected to a connection point 41.

Figure 1:
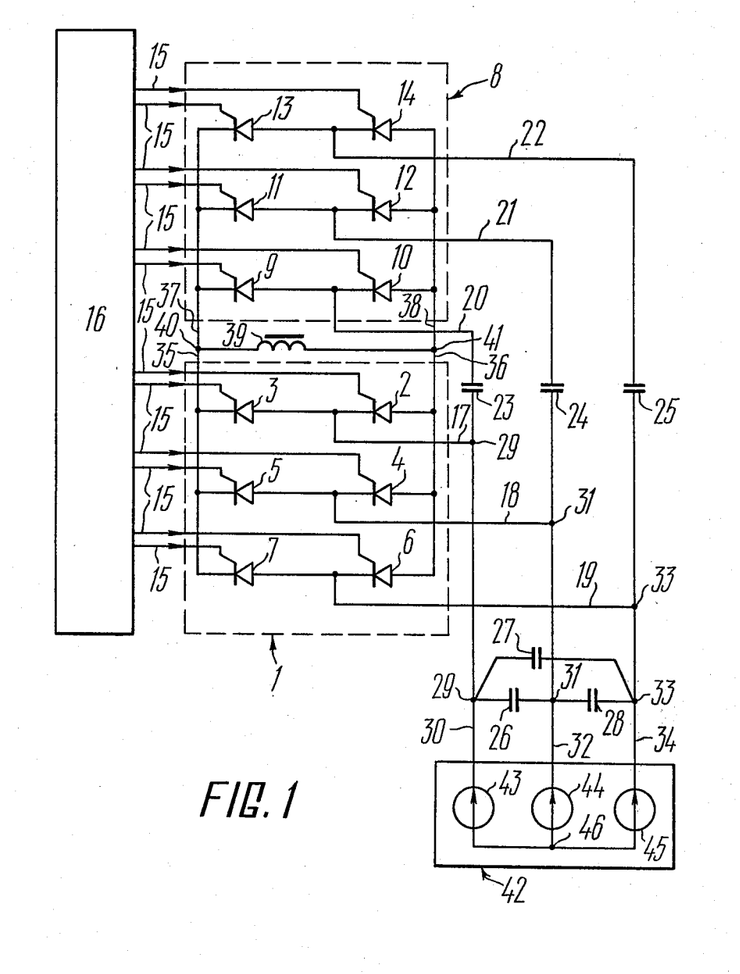
FIG. 1 shows an externally commutated compensation-type converter system, according to the invention.

FIG. 1 also illustrates an a-c mains 42. The a-c mains 42 has three a-c sources 43, 44, 45, each being designed for alternating voltage of a respective phase. The a-c sources 43, 44, 45 have their first terminals coupled to a connection point 46 and their second terminals coupled to respective common a-c terminals 30, 32, 34.

According to a preferred embodiment of the converter system, first terminals of inductors 47, 48, 49 (FIG. 2) are coupled to respective common a-c terminals 30, 32, 34, while second terminals 50, 51, 52 of the inductors 47, 48, 49, respectively, are used as the converter system outputs and are coupled to the a-c mains 42.

Figure 3:
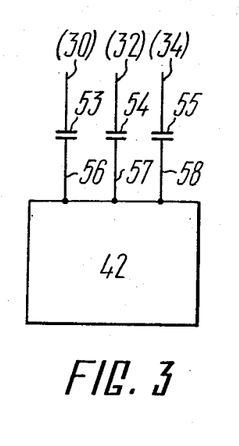
FIG. 3 shows the externally commutated compensation-type converter system with its outputs implemented as the terminals of capacitors, according to the invention.

According to another preferred embodiment of the converter system, first terminals of capacitors 53, 54, 55 (FIG. 3) are coupled to respective common a-c terminals 30, 32, 34 (FIG. 1), while second terminals 56, 57, 58 of the capacitors 53, 54, 55 are used as the converter system outputs.

Figure 4:
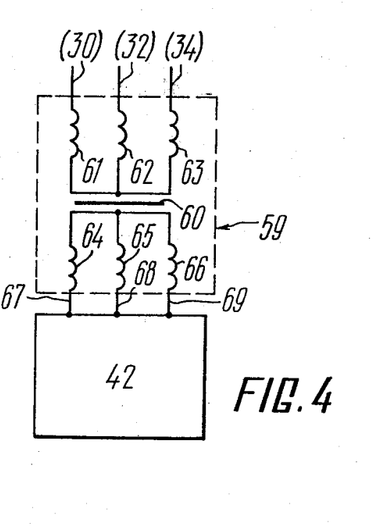
FIG. 4 shows the externally commutated compensation-type converter system with its outputs implemented as the terminals of a matching transformer, according to the invention.

According to still another preferred embodiment of the converter system, there is provided a matching transformer 59 (FIG. 4) with a magnetic circuit 60 which mounts rectifier windings 61, 62, 63 and mains windings 64, 65, 66. The terminals of the rectifier windings 61, 62, 63 which serve as the terminals of the matching transformer 59 are coupled to respective a-c terminals 30, 32, 34. The terminals of the mains windings 64, 65, 66 serve as terminals 67, 68, 69 of the matching transformer 59 and as the converter system outputs.

In order to operate in the d-c energy inverting mode, the converter system is provided with a d-c source 70 (FIG. 5) having its output 71 coupled to the smoothing reactor 39 and its output 72 coupled to the connection point 40. To limit the rate of rise of current passing through the circuits of the rectifiers 2, 3, 4, 5, 6, 7, the main bridge 1 has saturation inductors 73, 74, 75, 76, 77, 78. First terminals of the saturation inductors 73, 74 are coupled, respectively, to the cathode of the rectifier 2 and the anode of the rectifier 3. Second terminals of the saturation inductors 73, 74 are coupled to the connection point 29. First terminals of the saturation inductors 75, 76 are coupled, respectively, to the cathode of the rectifier 4 and the anode of the rectifier 5. Second terminals of the saturation inductors 75, 76 are coupled to the connection point 31. First terminals of the saturation inductors 77, 78 are coupled, respectively, to the cathode of the rectifier 6 and the anode of the rectifier 7, while second terminals of the saturation inductors 77, 78 are coupled to the connection point 33.

In order to limit the rate of rise of current passing through the circuits of the rectifiers 9, 10, 11, 12, 13, 14, the additional bridge 8 has additional saturation inductors 79, 80. The additional saturation inductor 79 is placed between the d-c terminal 37 of the additional bridge 8 and the connection point 40, while the additional saturation inductor 80 is placed between the d-c terminal 38 and the connection point 41. Winding 84, 85 (FIG. 6) of the additional saturation inductors 79, 80 (FIG. 5) are wound on a common magnetic circuit 86 which has no air gap and is made of a magnetically soft material.

To maintain commutation stability in the case of phase asymmetry in the a-c mains 42 (FIG. 1), the converter system also comprises additional inductors 81, 82, 83 (FIG. 5) placed, respectively, between the a-c terminals 17, 20; 18, 21; 19, 22.

Figure 2:
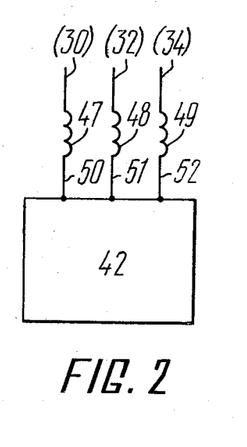
FIG. 2 shows the externally commutated compensation-type converter system with its outputs implemented as the terminals of inductors, according to the invention.
Figure 7:
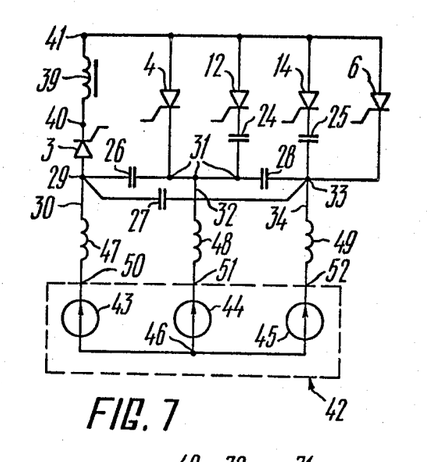
FIG. 7 shows an equivalent network of the externally commutated compensation-type converter system of FIGS. 1, 2 operated within the commutation interval for the anode group of rectifiers, according to the invention.

FIG. 7 shows an equivalent network of the converter system of FIGS. 1, 2 operated within the commutation interval for the anode group of the rectifiers 4, 12, 14, 6.

Figure 5:
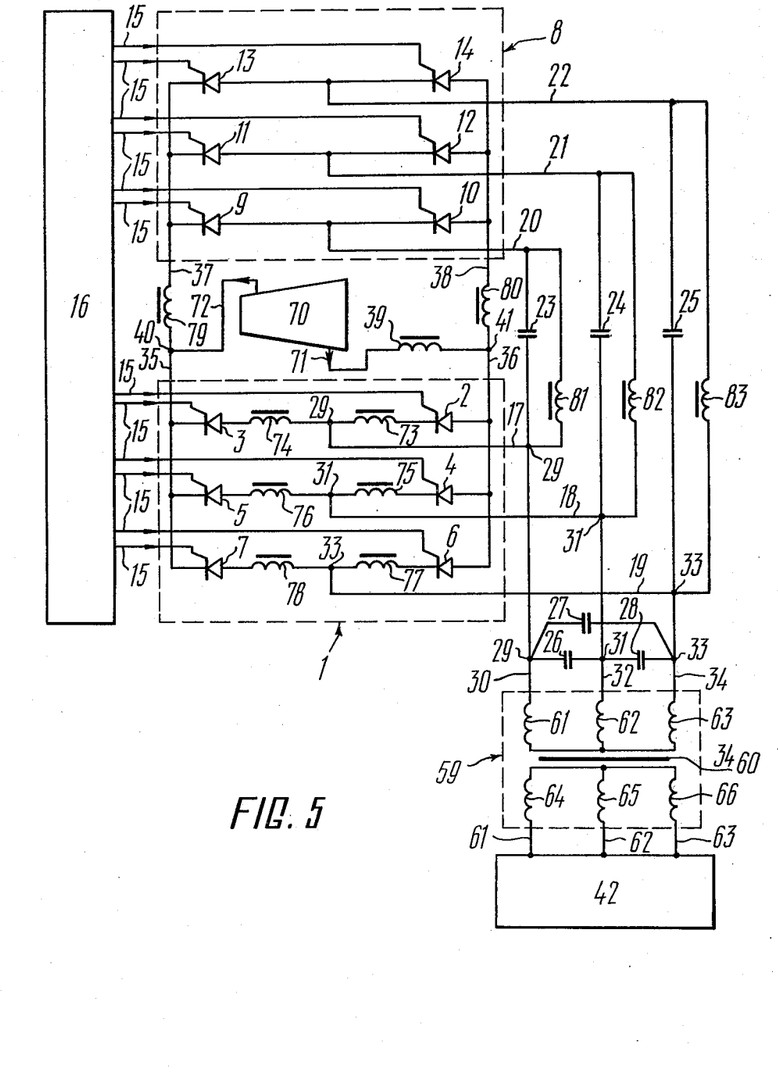
FIG. 5 shows the externally commutated compensation-type converter system which is operated in the d-c energy inverting mode, according to the invention.
Figure 6:
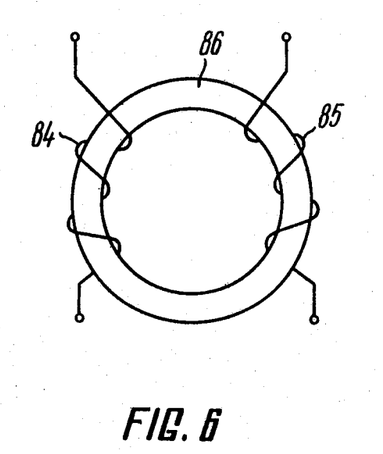
FIG. 6 shows physical implementation of additional saturation inductors, according to the invention.
Figure 8:
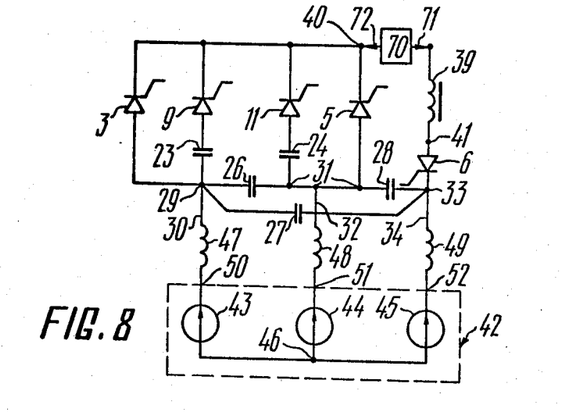
FIG. 8 shows an equivalent network of the externally commutated compensation-type converter system of FIG. 5 operated within the commutation interval for the cathode group of rectifiers, according to the invention.

FIG. 8 shows an equivalent network of the converter system of FIG. 5 operated within a further commutation interval for the cathode group of the rectifiers 3, 9, 11, 15.

FIGS. 9 a, b, c, d, e, f, g, h, i, j, k, l, show operational timing diagrams for the converter system of FIGS. 1, 7 operated according to the proposed method providing for forced commutation and blocking of the rectifiers of the system.

Figure 9A:
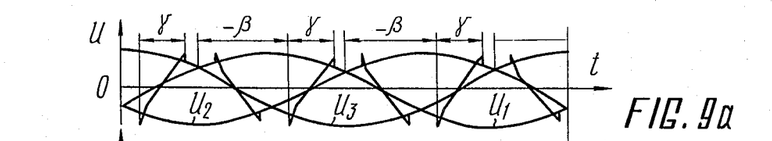
FIGS. 9a, b, c, d, e, f, g, h, i, j, k, l show operational timing diagrams for the converter system of FIGS. 1, 7, according to the invention.

FIG. 9a shows how voltage U generated by the a-c mains 42 (FIGS. 1, 7) varies with time t. The voltage U (FIG. 9a) is comprised of voltages $U_1$, $U_2$, $U_3$ belonging, respectively, to three phases (FIGS. 1, 7). The point where curves representing a pair of voltages $U_1$, $U_2$, $U_3$ intersect each other corresponds to the origin of firing angle $\beta$. The commutation time determines the duration of commutation interval $\gamma$ with $\beta = 75°$ and $\gamma = 37°$.

Figures 9B, 9C, 9D:
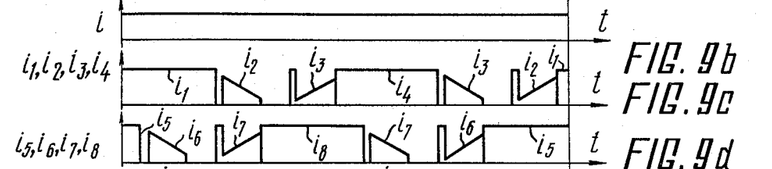

FIG. 9b shows how current i of the smoothing reactor 39 (FIGS. 1, 7) varies with time t (FIG. 9).

FIG. 9c shows how currents $i_1$, $i_2$, $i_3$, $i_4$ passing through the rectifiers 3, 9, 10, 2 (FIG. 1), respectively, vary with time t (FIG. 9).

FIG. 9d shows how currents $i_5$, $i_6$, $i_7$, $i_8$ passing through the rectifiers 4, 12, 11, 5 (FIG. 1) vary with time t (FIG. 9).

Figure 9E:
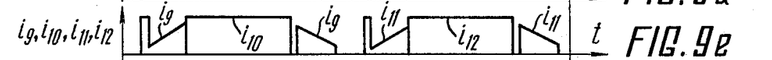

FIG. 9e shows how currents $i_9$, $i_{10}$, $i_{11}$, $i_{12}$ passing through the rectifiers 14, 6, 13, 7 (FIG. 1), respectively, vary with time t (FIG. 9).

Figures 9F, 9G, 9H:
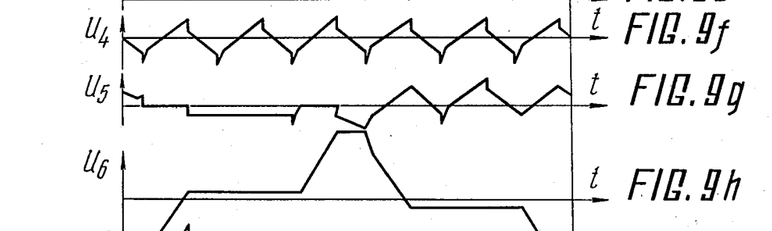

FIG. 9f shows how voltage $U_4$ across the smoothing reactor 39 (FIGS. 1, 7) varies with time t (FIG. 9).

FIG. 9g shows how voltage $U_5$ across the rectifier 14 (FIG. 1) varies with time t (FIG. 9).

FIG. 9h shows how voltage $U_6$ across the series capacitor 25 (FIGS. 1, 7) varies with time t (FIG. 9).

Figures 9I, 9J, 9K, 9L:
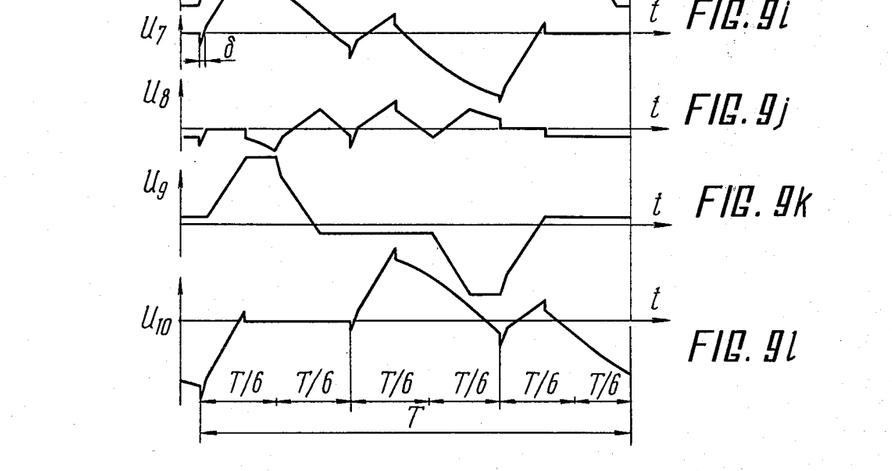

FIG. 9i shows how voltage $U_7$ across the rectifier 4 (FIGS. 1, 7) varies with time t (FIG. 9).

Blocking time $\delta$ determines the blocking interval for the rectifier 4 (FIG. 1).

FIG. 9j shows how voltage $U_8$ across the rectifier 12 varies with time t (FIG. 9).

FIG. 9k shows how voltage $U_9$ across the series capacitor 24 varies with time t (FIG. 9).

FIG. 9l shows how voltage $U_{10}$ across the rectifier 6 (FIGS. 1, 7) varies with time t (FIG. 9).

Figure 10A:
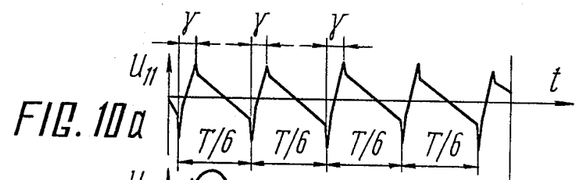
FIGS. 10a, b, c, d show operational timing diagrams for the converter system of FIGS. 1, 7 operated with excess power rating, according to the invention.
Figures 10B, 10C:
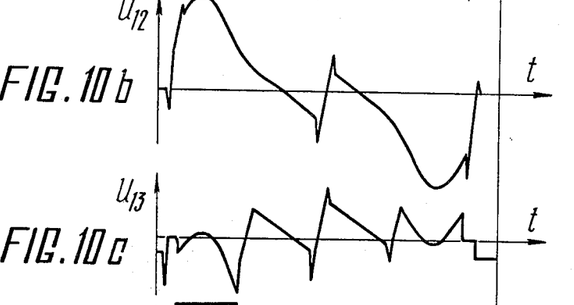
Figure 10D:
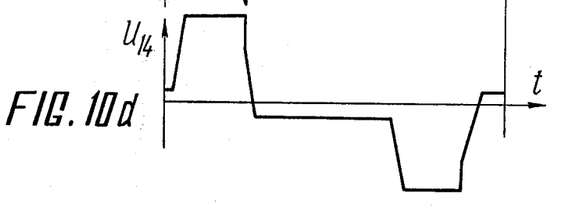

FIGS. 10 a, b, c, d show operational timing diagrams for the converter system of FIGS. 1, 7 operated with excess power eating.

FIG. 10a shows how voltage $U_{11}$ across the smoothing reactor 39 (FIGS. 1, 7) varies with time t (FIG. 10), with $\gamma = 14°$ in this case.

FIG. 10b shows how voltage $U_{12}$ across the rectifier 4 (FIGS. 1, 7) varies with time t (FIG. 10).

FIG. 10c shows how voltage $U_{13}$ across the rectifier 12 (FIGS. 1, 7) varies with time t (FIG. 10).

FIG. 10d shows how voltage $U_{14}$ across the series capacitor 24 (FIGS. 1, 7) varies with time t (FIG. 10).

FIGS. 11 a, b, c, d, e, f, g, h, i show operational timing diagrams for the converter system operated in the d-c energy inverting mode.

Figures 11A, 11B:
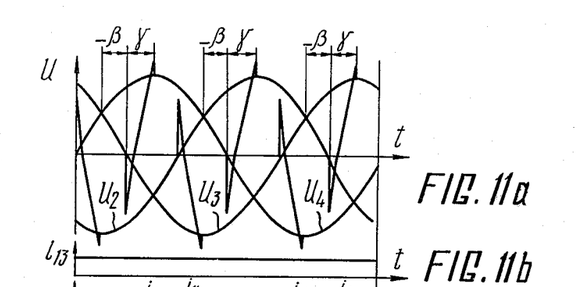

FIG. 11a shows how voltage U generated by the a-c mains 42 (FIGS. 5, 8) varies with time t (FIG. 11), with $\beta = 30°$ and $\gamma = 30°$.

FIG. 11b shows how current $i_{13}$ from the d-c source 70 (FIGS. 5, 8) varies with time t (FIG. 11).

Figure 11C:
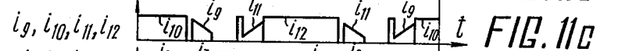

FIG. 11c shows how currents $i_9$, $i_{10}$, $i_{11}$, $i_{12}$ passing through the rectifiers 6, 14, 13, 7 (FIG. 5) vary with time t (FIG. 11).

Figures 11D, 11E, 11F:
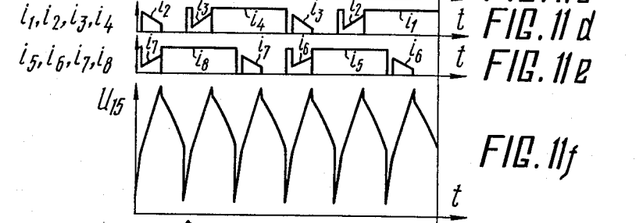

FIG. 11d shows how currents $i_1$, $i_2$, $i_3$, $i_4$ passing through the rectifiers 3, 9, 10, 2 (FIG. 5) vary with time t (FIG. 11).

FIG. 11e shows how currents $i_5$, $i_6$, $i_7$, $i_8$ passing through the rectifiers 4, 12, 11, 5 (FIG. 5) vary with time t (FIG. 11).

FIG. 11f shows how voltage $U_{15}$ that appears between the connection points 41, 40 (FIGS. 5, 8) varies with time t (FIG. 11).

Figures 11G, 11H, 11I:
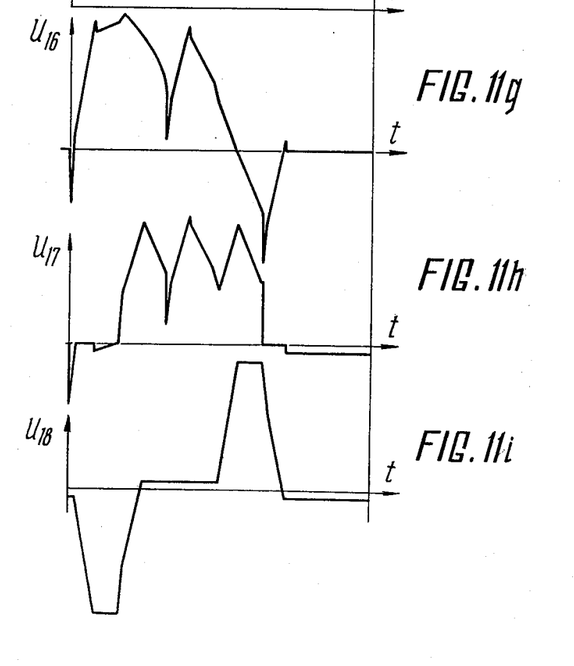

FIG. 11g shows how voltage $U_{16}$ across the rectifier 3 (FIGS. 5, 8) varies with time t (FIG. 11).

FIG. 11h shows how voltage $U_{17}$ across the rectifier 9 (FIGS. 5, 8) varies with time t (FIG. 11).

FIG. 11i shows how voltage $U_{18}$ across the series capacitor 23 (FIGS. 5, 8) varies with time t (FIG. 11).

Figures 12A, 12B, 12C, 12D, 13, 14A, 14B, 14C:
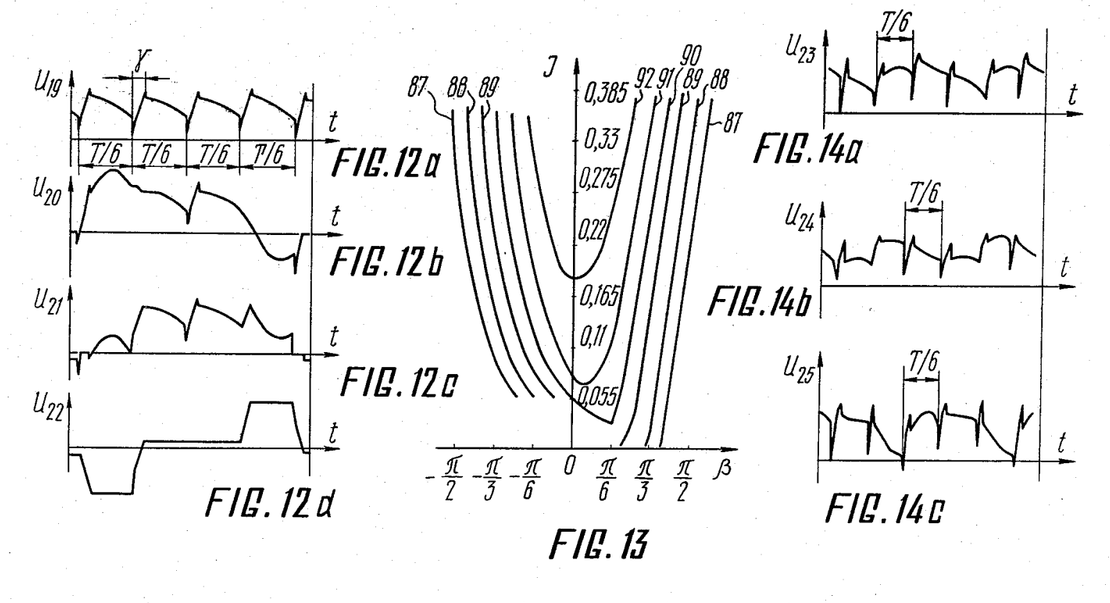

FIGS. 12 a, b, c, d show operational timing diagrams for the converter system of FIGS. 5, 8 operated with excess power rating.

FIG. 12a shows how voltage $U_{19}$ that appears between the connection points 41, 40 (FIGS. 5, 8) varies with time t (FIG. 12).

FIG. 12b shows how voltage $U_{20}$ across the rectifier 3 (FIGS. 5, 8) varies with time t (FIG. 12).

FIG. 12c shows how voltage $U_{21}$ across the rectifier 9 (FIGS. 5, 8) varies with time t (FIG. 12).

FIG. 12d shows how voltage $U_{22}$ across the series capacitor 23 (FIGS. 5, 8) varies with time t (FIG. 12).

FIG. 13 shows graphs 87, 88, 89, 90, 91, 92 which illustrate how inverted current I, related to the basic value equal to the amplitude of the short-circuit current through the common a-c terminals 30, 32, 34 (FIG. 5) varies with firing angle $\beta$, with K=0.4; 0.6; 0.8; 1.0; 1.2; 1.4, where K is the deviation factor which determines a condition in which the voltage generated by the d-c source 70 (FIG. 5) deviates from its rated value.

FIGS. 14 a, b, c show operational timing diagrams for voltages $U_{23}$, $U_{24}$, $U_{25}$ that appear between the connection points 41, 40 (FIG. 5) with the a-c mains 42 in emergencies as follows: one of the phases is short-circuited; a short-circuit condition involves two phases and the connection point 46 is short-circuited simultaneously; and a short-circuit condition involves two phases.

The converter system of the invention operated in accordance with the proposed method providing for forced commutation and blocking of the rectifiers thereof operates as follows.

In accordance with the variation of voltage U (FIG. 9a) generated by the a-c mains 42, the outputs 15 of the control unit 16 generate control signals that are applied to the gates of the rectifiers 2, 3, 4, 5, 6, 7 (FIG. 1) of the main bridge 1 and to the gates of the rectifiers 9, 10, 11, 12, 13, 14 of the additional bridge 8.

Period T (FIG. 9) of voltage U (FIG. 9a) from the a-c mains 42 (FIG. 1) is broken down into six repetitive intervals, each being designated as T/6 (FIG. 9). When voltage U is symmetrical, commutation processes within all the repetitive intervals T/6 are identical in spite of the fact that respective new rectifiers among those labelled 2, 3, 4, 5, 6, 7, 9, 10, 11, 12, 13, 14 (FIG. 1) and belonging to the main and additional bridges 1, 8 are activated within each repetitive interval T/6 for period T.

Each repetitive interval T/6 involves commutation interval $\gamma$ (FIG. 10a) and an intercommutation interval. During the intercommutation interval, only the main bridge 1 (FIG. 1) is activated, while in commutation interval $\gamma$ (FIG. 10a) the additional bridge is activated.

The duration of commutation interval $\gamma$ (FIG. 10a) exceeds zero but is less than 60° (electrical) depending on the mode of operation of the converter system and on the value of current i (FIG. 9b) passing through the smoothing reactor 39 (FIGS. 1, 7). Since identical commutation processes occur in repetitive intervals T/6 (FIG. 9), consider the operation of the converter system related to that interval T/6 in which the commutation of current i (FIG. 9b) through the smoothing reactor 39 (FIGS. 1, 7) occurs in the anode group of the rectifiers 2, 4, 6 of the main bridge 1 from the rectifier 4 to the rectifier 6. During the intercommutation interval preceding the described commutation process, the rectifiers 3, 4 of the main bridge 1 are turned on. In this case, currents $i_1$, $i_5$ (FIGS. 9c, d) passing through the rectifiers 3, 4 (FIG. 7) are equal to current i (FIG. 9b) passing through the smoothing reactor 39 (FIG. 7).

Voltages $U_6$, $U_9$ (FIGS. 9h, k) across the series capacitors 25, 24 (FIG. 7) are determined by the charges accumulated during the preceding commutation. At the beginning of the commutation which is determined by the value of firing angle $\beta$ (FIG. 9a), the rectifier 14

(FIG. 7) is turned on and current $i_9$ (FIG. 9e) begins to flow through it.

The rectifier 4 (FIG. 7) is made non-conductive with the help of reverse voltage $U_7$ (FIG. 9i) which is determined by the charges accumulated on the shunt capacitor 28 (FIG. 7) and on the series capacitor 25. At the given point in time, the capacitors 28, 25 are connected in series and voltage $U_7$ (FIG. 9i) is equal in this case to the difference of the voltage across the shunt capacitor 28 (FIG. 7), which, in turn, is a linear difference of voltages $U_3$ and $U_2$ (FIG. 9a), and voltage $U_6$ (FIG. 9h) across the capacitor 25 (FIG. 7).

Current i (FIG. 9b) of the smoothing reactor 39 (FIG. 7) has its path as follows: the rectifier 14, the series capacitor 25, the shunt capacitor 28, the inductor 48, the source 44 of the a-c mains 42, the connection point 46, the source 43 of the a-c mains 42, the inductor 47, and the rectifier 3.

Voltages $U_7$ (FIG. 9i) across the rectifier 4 being blocked (FIG. 7) therefore varies with the result that voltage $U_8$ (FIG. 9j) across the rectifier 12 (FIG. 7) varies too. In addition, from the very beginning of commutation interval $\gamma$ (FIG. 9a) current i (FIG. 9b) of the smoothing reactor 39 (FIG. 7) is redistributed in the course of its passage through the inductors 48, 49 as the number of charges on the shunt capacitor 28 (FIG. 9a) is changed. At a point in time when voltage $U_7$ (FIG. 9i) applied to the rectifier 12 (FIG. 7) reverses its polarity the rectifier 12 is driven to conductive state and allowed to pass current $i_6$ (FIG. 9d). Current i (FIG. 9b) of the smoothing reactor 39 (FIG. 7) is maintained constant, while current i (FIG. 9l) of the rectifier 14 (FIG. 7) is decreased by the value of current $i_6$ (FIG. 9d) of the rectifier 12 (FIG. 7). The rectifiers 12, 14 (FIG. 7) are held in conductive state till the end of commutation interval $\gamma$ and pass currents $i_6$, $i_9$ (FIGS. 9d, e), respectively. Under these conditions, voltage $U_6$ (FIG. 9h) across the series capacitor 25 (FIG. 7) is decreased to zero, whereas voltage $U_9$ (FIG. 9k) across the series capacitor 24 rises to the value equal to the difference of voltages $U_3$ and $U_2$ (FIG. 9a) of the phases being commutated. In order to additionally increase the charge on the series capacitor 24 (FIG. 7), and, therefore, voltage $U_9$ (FIG. 9k) used in the next commutation interval (FIG. 9a), the rectifier 6 (FIG. 7) is made to conduct after voltage $U_{10}$ (FIG. 9l) applied to it has reversed its polarity; current $i_{10}$ (FIG. 9e) begins to flow through the rectifier 6. On completion of commutation, reverse voltage $U_5$ (FIG. 9g) resulted from the additional charge on the series capacitor 25 (FIG. 7) and, therefore, from voltage $U_6$ (FIG. 9h) is applied to the rectifier 14 (FIG. 7). At the same time, reverse voltage $U_8$ (FIG. 9j) resulted from the charges on the capacitors 28, 24 (FIG. 7) is applied to the rectifier 12 (FIG. 7).

As long as commutation takes place, voltage $U_4$ (FIG. 9f) across the smoothing reactor 39 (FIG. 7) tends to rise. After commutation has been terminated, voltage $U_4$ (FIG. 9f) across the smoothing reactor 39 (FIG. 7) tends to fall and current i (FIG. 9b) now passes as follows: the inductor 49, the sources 45, 43 of the a-c mains 42, the inductor 47, and the rectifier 3. In this case, the capacitors 24, 25 are turned off, but the charges accumulated on their plates are held constant.

As the load on the converter system is increased, the duration of commutation interval $\gamma$ (FIG. 10a) is decreased. The rate of rise of voltage $U_{14}$ (FIG. 10d) across the series capacitor 24 (FIG. 7) is increased. However, the maximum value of voltage $U_{14}$ (FIG. 10d) across the series capacitor 24 (FIG. 7) varies insufficiently due to the fact that the duration of commutation interval $\gamma$ (FIG. 10a) is decreased and no overvoltage condition is therefore available to the converter system. During commutation interval $\gamma$ (FIG. 10a), the rate of rise of voltage $U_{12}$ (FIG. 10b) across the anode of the rectifier 4 being blocked (FIG. 7) is increased. Also, there result an increase in the rate of rise of voltage $U_{13}$ (FIG. 10c) across the anode of the blocked rectifier 12 (FIG. 7) during following commutation intervals $\gamma$ (FIG. 10a).

In an overload condition, namely, with an excess power rating, the converter system of the invention therefore possesses good commutation stability without an increase in commutating voltages and the limit overload value is determined by a permissible rate of rise of the voltage across the anodes of the blocked rectifiers which depends on the type of the rectifiers used.

To provide for galvanic isolation of the power circuit of the converter system from the a-c mains 42 (FIG. 1), the capacitors 53, 54, 55 (FIG. 3) are coupled to the common a-c terminals 30, 32, 34, respectively.

To provide for optimum matching of the converter system and the a-c mains 42 (FIG. 1), the matching transformer 59 (FIG. 4) is coupled to the common a-c terminals 30, 32, 34.

In accordance with the proposed method, the inverting mode of operation of the converter system is as follows.

To drive the converter system to the inverting mode, it is necessary to decrease firing angle (FIG. 11a). Thus, within the period of time preceding the beginning of commutation, the path of current $i_{13}$ (FIG. 11b) obtained from the d-c source 70 (FIG. 5) is as follows: the smoothing reactor 39 (FIGS. 5, 8), the rectifier 6, the inductor 49, the sources 45, 43 of the a-c mains 42, and the rectifier 3.

At the point in time when commutation commences the rectifier 11 is made to conduct and begins to pass current $i_7$ (FIG. 11e). The rectifier 3 is driven to non-conductive state since reverse voltage $U_{16}$ (FIG. 11g) is applied to it for its blocking interval $\delta$ (FIG. 8). At the initial instant of commutation, current $i_{13}$ (FIG. 11b) from the d-c source 70 (FIG. 8) passes through the following components: the smoothing reactor 39, the inductor 49, the sources 45, 43 of the a-c mains 42, the inductor 47, the capacitor 26, the capacitor 24, and the rectifier 11.

Reverse voltage $U_{17}$ (FIG. 11h) across the rectifier 9 (FIG. 8) falls down and at the instant when it transfers through a zero value the rectifier 9 is made to conduct and passes current $i_2$ (FIG. 11d).

Under these conditions, current $i_{13}$ (FIG. 11b) from the d-c source 70 (FIG. 8) is maintained constant, current $i_7$ (FIG. 11e) is decreased, and current $i_2$ (FIG. 11d) begins to flow through the rectifier 9. Voltage $U_{18}$ (FIG. 11c) across the capacitor 23 (FIG. 8) tends to rise in this case. Forward voltage $U_{16}$ (FIG. 11g) across the rectifier 3 (FIG. 8) rises at the final rate of rise. During commutation interval $\gamma$ (FIG. 11a), voltage $U_{15}$ (FIG. 11f) between the connection points 41, 40 (FIG. 5) rises. From the very beginning of commutation interval (FIG. 11a) current $i_{13}$ (FIG. 11b) from the d-c source 70 (FIG. 8) is redistributed between the inductors 47, 48 for the phases being commutated. At the end of commutation interval $\gamma$ the rectifiers 5 (FIG. 8) is driven to conductive state and passes current $i_8$ (FIG. 11e). Now, the rectifiers 9, 11 (FIG. 8) are blocked. During the time following the described commutation process, namely, during the intercommutation interval, the rectifiers 5, 6 are made to conduct and pass respective currents $i_8$, $i_{10}$ (FIGS. 11e, d) that are equal to current $i_{13}$ (FIG. 11b) provided by the d-c source 70 (FIG. 8). Now, a fall in voltage $U_{15}$ (FIG. 11f) between the connection points 41, 40 occurs.

With an increased load on the converter system, commutation interval $\gamma$ (FIG. 12a) is decreased. Under these conditions, the rate of rise of forward voltage $U_{20}$ (FIG. 12b) across the rectifier 3 is increased and the rate of rise of voltage $U_{21}$ (FIG. 12c) across the blocked rectifier 9 (FIG. 8) is increased too during following commutation intervals $\gamma$ (FIG. 12a). The rate of rise of voltage $U_{22}$ (FIG. 12d) across the capacitor 23 is increased. However, the maximum value of voltage U is not increased since the duration of commutation interval $\gamma$ is decreased.

Therefore, considerable overloads on the converter system do not affect its commutation stability and no over voltage condition takes place in the power section of the system.

In the inverting mode, the converter system has the overload capacity analogous to that available in the case of the reactive power compensation mode.

To vary the load on the converter system, it is necessary to vary firing angle $\beta$ (FIGS. 11, 13). An increase in firing angle $\beta$ results in an increase in inverted current I. The graphs 87, 88, 89, 90, 91, 92 according to which inverted current I varies with firing angle $\beta$ show that inverted current I rises when the voltage generated by the d-c source 70 is increased, which means that the deviation factor K is increased too.

With the converter system, the reactive power consumption ($\beta > 0$) and the reactive power generation ($\beta < 0$) are possible. With $\beta \approx 0$, the power factor of the converter system approaches unity and is maintained constant at different values of K.

The load on the converter system operated in the reactive power compensation mode is controlled as described above. In this case, firing angle $\beta$ (FIG. 9) varies insufficiently within the regions $-90°$ and $+90°$ for the reactive power generation and the reactive power consumption mode, respectively.

With the a-c mains 42 (FIGS. 5, 8) in asymmetrical emergency, short-circuit conditions may occur as follows. First, a short-circuit condition involves a single phase, namely, the source 43. Second, a short-circuit condition involves two phases, namely, the sources 43, 44 which are short-circuited simultaneously with respect to the connection point 46. Finally, a short-circuit condition involves two phases, namely, the sources 43, 44. In all cases described above, respective asymmetrical voltages $U_{23}$, $U_{24}$, $U_{25}$ (FIGS. 14a, b, c) appear between the connection points 41, 42 in repetitive intervals T/6.

FIG. 14 shows that the commutation stability of the converter system is held invariable and the overvoltage related to the power section of the system does not exceed a permissible limit.

The invention therefore provides for a decrease in the surges of reverse voltages across the rectifiers of the converter system and makes it immune to commutation failures which might occur during the compensation and inverting modes of operation due to random symmetrical deviations of the voltages generated by the a-c mains and the d-c source, so that the energy is delivered to the a-c mains under much more reliable conditions.

Moreover, the regulating capability of the converter system is increased.

The invention also makes it possible to continue the supply of electric power in an independent mode when severe emergency conditions take place in an a.c. mains, such as broken power system or an interrupt in the communication to the system resulted from damaged transmission lines.

What is claimed is:

1. An externally commutated compensation-type converter system comprising:
   a control unit having a plurality of outputs;
   a first bridge having at least three a-c terminals and first and second d-c terminals;
   rectifiers of said first bridge having gates;
   a second bridge having at least three a-c terminals and first and second d-c terminals;
   rectifiers of said second bridge having gates;
   said gates of said rectifiers of said first and second bridges coupled to outputs of said plurality of outputs of said control unit;
   said first d-c terminals of said first and second bridges which interconnect one another;
   said second d-c terminals of said first and second bridges which interconnect one another;
   a smoothing reactor placed between said first and second d-c terminals of said first and second bridges;
   at least three series capacitors;
   one of said series capacitors placed between first ones of said a-c terminals of said first and second bridges;
   the second one of said series capacitors placed between second ones of said a-c terminals of said first and second bridges;
   the third one of said series capacitors placed between third ones of said a-c terminals of said first and second bridges;
   at least three shunt capacitors;
   one of said shunt capacitors coupled in parallel with first and second ones of said a-c terminals of said first bridge;
   the second one of said shunt capacitors coupled in parallel with first and third ones of said a-c terminals of said first bridge;
   the third one of said shunt capacitors coupled in parallel with second and third ones of said a-c terminals of said first bridge;
   a first common a-c terminal formed by connecting the first terminal of said first series capacitor, said first a-c terminal of said first bridge and first terminals of said first and second shunt capacitors;
   a second common a-c terminal formed by connecting the first terminal of said second series capacitor, said second a-c terminal of said first bridge, the second terminal of said first shunt capacitor and the first terminal of said third shunt capacitor;
   a third common a-c terminal formed by connecting the first terminal of said third series capacitor, said third a-c terminal of said first bridge and the second terminals of said second and third shunt capacitors.

2. An externally commutated compensation-type converter system as claimed in claim 1 comprising:
   at least three inductors;
   one of said inductors having its first terminal coupled to said first common a-c terminal and its second terminal serving as the first output of said converter system;

the second one of said inductors having its first terminal coupled to said second common a-c terminal and its second terminal serving as the second output of said converter system;

the third one of said inductors having its first terminal coupled to said third common a-c terminal and its second terminal serving as the third output of said converter system;

3. An externally commutated compensation-type converter system as claimed in claim 2 comprising:
a first additional saturation inductor placed between said first d-c terminals of said first and second bridges;
a second additional saturation inductor placed between said second d-c terminals of said first and second bridges.

4. An externally commutated compensation-type converter system as claimed in claim 3 comprising a d-c source having its first output coupled to said smoothing reactor and its second output coupled to said additional saturation inductor and to said additional saturation inductor and to said first d-c terminal of said first bridge.

5. An externally commutated compensation-type converter as claimed in claim 2 comprising:
at least three additional inductors;
one said additional inductors placed between said first a-c terminals of said first and second bridges;
the second one of said additional inductors placed between said second a-c terminals of said first and second bridges;
the third one of said additional inductors placed between said third a-c terminals of said first and second bridges.

6. An externally commutated compensation-type converter system as claimed in claim 1 comprising:
at least three capacitors;
one of said capacitors havings its first terminal coupled to said first common a-c terminal and its second terminal serving as the first output of said converter system;
the second one of said capacitors having its first terminal coupled to said second common a-c terminal and its second terminal serving as the second output of said converter system;
the third one of said capacitors having its first terminal coupled to said third common a-c terminal and its second terminal serving as the third output of said converter system.

7. An externally commutated compensation-type converter system as claimed in claim 6 comprising:
a first additional saturation inductor placed between said first d-c terminals of said first and second bridges;
a second additional saturation inductor placed between said second d-c terminals of said first and second bridges.

8. An externally commutated compensation-type converter system as claimed in claim 7 comprising a d-c source having its first output coupled to said smoothing reactor and its second output coupled to said first additional saturation inductor and to said first d-c terminal of said first bridge.

9. An externally commutated compensation-type converter system as claimed in claim 3 comprising:
at least three additional inductors, the first of said additional inductors placed between said first a-c terminals of said first and second bridges;
the second of said additional inductors placed between said second a-c terminals of said first and second bridges;
the third of said additional inductors placed between said third a-c terminals of said first and second bridges.

10. An externally commutated compensation-type converter system as claimed in claim 1 comprising a matching transformer having first, second and third terminals that are coupled, respectively, to said first, second and third common a-c terminals and also having fourth, fifth and sixth terminals serving as the first, second and third outputs of said converter system.

11. An externally commutated compensation-type converter system as claimed in claim 10 comprising:
a first additional saturation inductor placed between said first d-c terminals of said first and second bridges;
a second additional saturation inductor placed between said second d-c terminals of said first and second bridges.

12. An externally commutated compensation-type converter system as claimed in claim 11 comprising a d-c source having its first output coupled to said smoothing reactor and its second output coupled to said first additional saturation inductor and to said first d-c terminal of said first bridge.

13. An externally commutated compensation-type converter system as claimed in claim 10 comprising:
at least three additional inductors;
one of said additional inductors placed between said first a-c terminals of said first and second bridges;
the second one of said additional inductors placed between said second a-c terminals of said first and second bridges;
the third one of said additional inductors placed between said third a-c terminals of said first and second bridges.

14. An externally commutated compensation-type converter system as claimed in claim 1 comprising:
a first additional saturation inductor placed between said first d-c terminals of said first and second bridges;
a second additional saturation inductor placed between said second d-c terminals of said first and second bridges.

15. An externally commutated compensation-type converter system as claimed in claim 14 comprising a d-c source having its first output coupled to said smoothing reactor and its second output coupled to said first additional saturation inductor and to said first d-c terminal of said first bridge.

16. An externally commutated compensation-type converter system as claimed in claim 14 comprising:
at least three additional inductors;
one of said additional inductors placed between said first a-c terminals of said first and second bridges;
the second one of said additional inductors placed between said second a-c terminals of said first and second bridges;
the third one of said additional inductors placed between said third a-c terminals of said first and second bridges.

17. An externally commutated compensation-type converter system as claimed in claim 14 comprising:
a common magnetic circuit;
a first winding of said first additional saturation inductor;

a second winding of said second additional saturation inductor;

said first and second windings wound on said common magnetic circuit.

18. An externally commutated compensation-type converter system as claimed in claim 17 wherein said magnetic circuit has no air gap and is made of magnetically soft material.

19. An externally commutated compensation-type converter system as claimed in claim 18 comprising a d-c source having its first output coupled to said smoothing reactor and its second output coupled to said first additional saturation inductor and to saif first d-c terminal of said first bridge.

20. An externally commutated compensation-type converter system as claimed in claim 19 comprising:
at least three additional inductors;
one of said additional inductors placed between said first a-c terminals of said first and second bridges;
the second one of said additional inductors placed between said second a-c terminals of said first and second bridges;
the third one of said additional inductors placed between said third a-c terminals of said first and second bridges.

21. An externally commutated compensation-type converter system as claimed in claim 1 comprising:
at least three additional inductors;
one of said additional inductors placed between said first a-c terminals of said first and second bridges;
the second one of said additional inductors placed between said second a-c terminals of said first and second bridges;
the third one of said additional inductors placed between said third a-c terminals of said first and second bridges.

22. A method for providing forced commutation and blocking of the rectifiers of a externally commutated compensation-type converter system comprising the following operations:
connecting said shunt capacitors and series capacitors after they have been charged, to said blocked rectifiers;
operating said control unit to act on said gates of said rectifiers;
commutating the current passing through said smoothing reactor from said blocked rectifier of said rectifiers to the next of said rectifiers of said first bridge in a sequence at which:
at the beginning of the commutation interval, the current passing through said smoothing reactor is transferred from said blocked rectifier of said first bridge to at least one of said rectifiers of said second bridge via one of said series capacitors;
during the commutation interval, the current passing through the smoothing reactor is additionally transferred to at least another one of said series capacitors;
at the end of the commutation interval, the current passing through said smoothing reactor is transferred from at least one of said rectifiers of said second bridge and from at least one of said series capacitors to a respective rectifier of said first bridge the next phase;
unblocking, at the beginning of the commutation interval, at least one of said rectifiers of the commutated phases of said second bridge;

applying a reverse voltage determined by the charges from the preceding commutation at the respective of said series and shunt capacitors, to the blocked rectifier of said rectifiers of said first bridge;
blocking the blocking one of said rectifiers of said first bridge with the help of the applied reverse voltage;
during beginning phase of the commutation interval unblocking another one of said rectifiers in the commutating phases of said second bridge;
additionally applying voltage determined by the charges at the respective ones of said series and shunt capacitors to the blocked one of said rectifiers of said first bridge;
additionally blocking the blocking one of said rectifiers of said first bridge;
at the end of the commutation interval unblocking the respective one of said rectifiers of said first bridge;
applying voltage determined by the charges left by the past commutation at the respective ones of said series and shunt capacitors to at least one of said rectifiers in commutating phases of said second bridge;
blocking at least one of said rectifiers in commutating phases of said second bridge.

23. A method as claimed in claim 22 wherein the following operations are performed at the beginning of commutation:
unblocking a respective rectifier of the next phase belonging to said rectifiers of said second bridge;
blocking a respective rectifier of the preceding phase belonging to said rectifiers of said first bridge with the help of the reverse voltage determined by the charges accumulated on one of said shunt capacitors of the phase being commutated and on one of the series capacitors of the next phase, said two capacitors being connected, at the given point in time, in series and coupled to said respective rectifier;
unblocking a respective rectifier of the preceding phase belonging to said rectifiers of said second bridge at the moment in time when the voltage applied to said respective rectifier reverses its polarity;
connecting additionally, during the given commutation step, a respective capacitor of said capacitors of the preceding phase to a respective rectifier of the same phase belonging to said rectifiers of said first bridge.

24. A method as claimed in claim 23 comprising blocking, at the end of the commutation interval of the last commutation step, a respective rectifier of the preceding phase belonging to said rectifiers of said second bridge with the help of the reverse voltage determined by the charge on one of the shunt capacitors of the phase being commutated and on one of the series capacitors of the preceding phase, said two capacitors being connected in series, at the given point in time, and coupled to said respective rectifier; and simultaneous blocking of a respective rectifier of the next phase belonging to said rectifiers of said second bridge with the help of the reverse voltage determined by the charge on one of the series capacitors of the next phase which is coupled, at the given point in time, in parallel with said respective rectifier.

25. A method as claimed in claim 23 comprising unblocking, at the end of the commutation interval of the last commutation step, the next one of said rectifiers of said first bridge when the voltage applied to said rectifier reverses its polarity.

26. A method as claimed in claim 23 comprising unblocking, at the end of the commutation interval of the last commutation step, a respective rectifier of the next phase belonging to said rectifiers of said first bridge, this being accomplished after the voltage applied to said rectifier has reversed its polarity, and the additional charges, that are accumulated on said series capacitors of the phases being commutated within the time interval between the point in time when the voltage applied to the next one of the rectifiers of the first bridge reverses its polarity and the end of commutation, being held constant to change the blocking voltage across one of the rectifiers of the first bridge at the beginning of the next commutation interval.

27. A method as claimed in claim 22 wherein the following operations are performed at the beginning of commutation:
- simultaneous unblocking of two rectifiers of the next and the preceding phase, respectively, belonging to said rectifiers of said first bridge;
- blocking a respective rectifier of the preceding phase belonging to said rectifiers of said first bridge with the help of the reverse voltage determined by the resulting charge on one of the shunt capacitors of the phase being commutated and on one of the series capacitors of the next phase, said two capacitors being connected, at the given point in time, in series and coupled to said respective rectifier, as well as on one of said series capacitors of the preceding phase which is coupled, at the given point in time, to said respective rectifier.

28. A method as claimed in claim 27 comprising unblocking, at the end of the commutation interval of the last commutation step, the next one of the rectifiers of said first bridge when the voltage applied to said rectifier reverses its polarity.

29. A method as claimed in claim 27 comprising unblocking a respective rectifier of the next phase belonging to said rectifiers of said first bridge at the end of the commutation interval of the last commutation step, this being accomplished after the voltage applied to said rectifier has reversed its polarity, and the additional charges, that are accumulated on said series capacitors of the phases being commutated within the time interval between the point in time when the voltage applied to the next one of the rectifiers of said first bridge reverses its polarity and the end of commutation, being held constant to change the blocking voltage across one of the rectifiers of the first bridge at the beginning of the next commutation interval.

30. A method as claimed in claim 27 comprising blocking, at the end of the commutation interval of the last commutation step, a respective rectifier of the preceding phase belonging to said rectifiers of said second bridge with the help of the reverse voltage determined by the charge on one of the shunt capacitors of the phase being commutated and on one of the series capacitors of the preceding phase, said two capacitors being connected in series, at the given point in time, and coupled to said respective rectifier; and simultaneous blocking of a respective rectifier of the next phase belonging to said rectifiers of said second bridge with the help of the reverse voltage determined by the charge on one of the series capacitors of the next phase which is coupled, at the given point in time, in parallel with said respective rectifier.

31. A method as claimed in claim 27 comprising blocking, prior to the end of commutation, a respective rectifier of the next phase belonging to said rectifiers of said second bridge when forward voltage is appllied to said respective rectifier with the help of a control pulse.

32. A method as claimed in claim 22, wherein the following operations are performed at the beginning of commutation:
- unblocking a respective rectifier of the preceding phase belonging to said rectifiers of said second bridge;
- blocking a respective rectifier of the preceding phase of the first bridge with the help of the reverse voltage determined by the charge on one of said series capacitors of the preceding phase;
- unblocking, during the next commutation step, a respective rectifier of the next phase belonging to said rectifiers of said second bridge at the point in time when the voltage applied to said respective rectifier reverses its polarity;
- connecting one of said shunt capacitors of the phase being commutated and one of said series capacitors of the next phase, said two capacitors being connected in series at the given point in time, to a respective rectifier of the preceding phase belonging to said rectifiers of said first bridge.

33. A method as claimed in claim 32 comprising blocking, prior to the end of the commutation interval, a respective rectifier of the next phase belonging to said rectifiers of said second bridge when forward voltage is applied to the rectifier with the help of a control pulse.

34. A method as claimed in claim 32 comprising unblocking, at the end of the commutation interval of the last commutation step, the next one of said rectifiers of said first bridge when the voltage applied to said rectifier reverses its polarity.

35. A method as claimed in claim 32 comprising unblocking a respective rectifier of the next phase belonging to said rectifiers of said bridge at the end of the commutation interval of the last commutation step, this being accomplished after the voltage applied to said respective rectifier has reversed its polarity, and the additional charges, that are accumulated on said series capacitors of the phases being commutated within the time interval between the point in time when the voltage applied to the next one of the rectifiers of said first bridge reverses its polarity and the end of the commutation, being held constant to change the blocking voltage across one of the rectifiers of the first bridge at the beginning of the preceding commutation interval.

36. A method as claimed in claim 32 comprising unblocking, at the end of the commutation interval of the last commutation step, a respective rectifier of the preceding phase belonging to said rectifiers of said second bridge with the help of the reverse voltage determined by the charge on one of the shunt capacitors of the phase being commutated and on one of the series capacitors of the preceding phase, said two capacitors being connected in series, at the given point in time, and coupled to said respective rectifier; and simultaneous blocking of a respective rectifier of the next phase belonging to said rectifiers of said second bridge with the help of the reverse voltage determined by the charge on one of the series capacitors of the next phase which is coupled, at the given point in time, in parallel with said respective rectifier.

37. A method as claimed in claim 22 wherein the next rectifier of those belonging to said first bridge is unblocked at the end of commutation interval of the last commutation step when the voltage applied to said rectifier reverses its polarity.

38. A method as claimed in claim 37 comprising blocking, at the end of the commutation interval of the last commutation step, a respective rectifier of the preceding phase belonging to said rectifiers of said second bridge with the help of the reverse voltage determined by the charge on one of the shunt capacitors of the phase being commutated and on one of the series capacitors of the preceding phase, said two capacitors being connected in series, at the given point in time, and coupled to said respective rectifier; and simultaneous blocking of a respective rectifier of the next phase belonging to said rectifiers of said second bridge with the help of the reverse voltage determined by the charge on one of the series capacitors of the next phase which is coupled, at the given point in time, in parallel with said respective rectifier.

39. A method as claimed in claim 37 comprising a blocking, prior to the end of the commutation interval, a respective rectifier of the next phase belonging to the rectifiers of said second bridge when forward voltage is applied to said rectifier with the help of a control pulse.

40. A method as claimed in claim 22 comprising unblocking a respective rectifier of the next phase belonging to said rectifiers of said first bridge at the end of the commutation interval of the last commutation step, this being accomplished after the voltage applied to said rectifier has reversed its polarity, and the additional charges, that are accumulated on said series capacitors of the phases being commutated within the time interval between the point in time when the voltage applied to the next one of the rectifiers of said first bridge reverses its polarity and the end of commutation, being held constant to change the blocking voltage across one of the rectifiers of the first bridge at the beginning of the next commutation interval.

41. A method as claimed in claim 40 comprising blocking, at the end of the commutation interval of the last commutation step, a respective rectifier of the preceding phase belonging to said rectifiers of said second bridge with the help of the reverse voltage determined by the charge on one of the shunt capacitors of the phase being commutated and on one of the series capacitors of the preceding phase, said two capacitors being connected in series, at the given point in time, and coupled to said respective rectifier; and simultaneous blocking of a respective rectifier of the next phase belonging to said rectifiers of said second bridge with the help of the reverse voltage determined by the charge on one of the series capacitors of the next phase which is coupled, at the given point in time, in parallel with said respective rectifier.

* * * * *